United States Patent [19]

Reilly

[11] 4,329,635
[45] May 11, 1982

[54] STEPPER MOTOR DAMPING CIRCUIT

[75] Inventor: Edward J. Reilly, Mayfield Heights, Ohio

[73] Assignee: Gould Inc., Rolling Meadows, Ill.

[21] Appl. No.: 183,843

[22] Filed: Sep. 3, 1980

[51] Int. Cl.$^3$ ............................................. G05B 19/40
[52] U.S. Cl. ................................................... 318/696
[58] Field of Search ............... 318/696, 685, 138, 254

[56] References Cited

U.S. PATENT DOCUMENTS

| 3,466,522 | 9/1969 | Cushing | 318/331 |
|---|---|---|---|
| 3,573,589 | 4/1971 | Beery | 318/601 |
| 3,573,593 | 4/1971 | Beery | 318/696 |
| 3,581,181 | 5/1971 | Wallace | 318/640 |
| 3,599,069 | 8/1971 | Welch | 357/61 |
| 3,628,110 | 12/1971 | Casaday | 318/379 |
| 3,660,746 | 5/1972 | Milek | 318/685 X |
| 3,727,121 | 4/1973 | Rich | 318/696 |
| 3,750,000 | 7/1973 | Bruckner et al. | 318/696 |
| 3,760,252 | 9/1973 | Beery | 318/696 |
| 3,767,993 | 10/1973 | Yablonski | 318/696 |
| 3,812,414 | 5/1974 | Abraham et al. | 318/696 |
| 3,893,012 | 7/1975 | Lin | 318/696 |
| 3,903,467 | 9/1975 | Eckardt | 318/696 |
| 3,962,617 | 6/1976 | Offut et al. | 318/696 |
| 3,967,179 | 6/1976 | Loyzim | 318/696 |
| 3,974,434 | 10/1976 | Yablonski | 318/696 |
| 4,025,859 | 5/1977 | Smith | 318/696 |
| 4,032,982 | 6/1977 | Arter et al. | 360/74.1 |
| 4,081,736 | 3/1978 | Leenhouts et al. | 318/696 |
| 4,144,482 | 3/1979 | Schwab | 318/381 |
| 4,164,697 | 8/1979 | Everett | 318/696 |
| 4,192,131 | 3/1980 | Hosokawa et al. | 378/357 |
| 4,218,643 | 8/1980 | Herald et al. | 318/696 |

Primary Examiner—B. Dobeck
Attorney, Agent, or Firm—Edward E. Sachs; John C. Tiernan; Barry L. Tummino

[57] ABSTRACT

A method and an apparatus is disclosed for electrically damping the rotation motion of a stepper motor. The voltage of the non-energized side of the motor windings is monitored and compared with the energized side. Once the voltage on the non-energized side reaches a predetermined value greater than the voltage on the energized side, the non-energized voltage is shunted to the energized voltage.

8 Claims, 4 Drawing Figures

STEPPER MOTOR DAMPING CIRCUIT

BACKGROUND OF THE INVENTION

This invention relates to a method and apparatus for controlling a stepping motor and more particularly is directed to a method and apparatus for electrically dampening a stepping motor.

One of the basic problems with regard to operation of a stepping motor at a high rate of speed is the ability to stop the stepper motor as it arrives at a final position with little or no overshoot or oscillation of the rotor. The prior art discloses a number of approaches to the problem of how to effectively dampen a stepping motor in order to achieve a quick stop time. The two main methods taught by the prior art are by mechanical friction and electrical damping.

Mechanical frictional devices reduce the mechanical overshoot and the audible noise by coupling a rotational inertial mass via a viscous medium. This is usually done by using disc or drums rotationally coupled through a thick silicon oil. These mechanical dampers must be tailored to a specific type motor, and even then they present a limit on the maximum stepping rate due to the load involved.

Electrical dampening has been taught in the prior art in two ways. The first way taught is to distort or correct the driving electrical signal so as to slow the motor during the later portions of each drive pulse. This method is very load-sensitive since the stop or slow-down signal must be changed. A much larger consumption of power is required in this type method and the maximum stepping rate is severely reduced as the full step period would be apportioned between the go and the stop modes. The second method taught in electrical dampening is by the use of dynamic braking. Dynamic braking can be used to utilize the loading of the generator effect of the moving motor to minimize the mechanical overshoot following a stop position change. When the stepper motor makes a step, each coil, whether or not it is energized, produces a voltage by generator action. The overshoot produces a voltage also and this voltage can be clamped or shorted by diodes, resistors, or combinations of both. Unfortunately, stepper motors have, like most multi-phased motors, quite good inter-coil coupling, which results in transformer action between driven and undriven coils. The phase of this coupling is such that a drive signal on one coil can be transformed to another coil in a polarity similar to a generated signal on the second coil. This results in the diode or resistor network clamping a transformer coupled drive signal which is undesired because of the power wasted, poor step response, and excessive heat due to the coil being partially shorted during energization of the first coil.

OBJECTS OF THE INVENTION

An object of the present invention is to provide a circuit that can improve means for electrically dampening a stepping motor in order to prevent any overshoot or oscillation about the final position to which it is being rotated.

Another object of this invention is to provide a quieter operating stepping motor without utilizing any additional power or command signals to the coils.

Still another object of the present invention is to provide a more simplified dampening circuit than has heretofore been possible which utilizes the generator signal from any or all of the coils to actuate the dampening function.

The above objects are given by way of example. Thus other desirable objects and advantages achieved by the invention may occur to those skilled in the art. The scope of the invention is to be limited only by the appended claims.

BRIEF SUMMARY OF THE INVENTION

The above objects and other advantages are achieved by the present invention. A method and apparatus is provided for electrically dampening a stepping motor. The present invention shorts all non-energized motor windings just following every drive pulse forcing the motor to act as a short-circuit generator just after every moving member has reached its desired position and the kinetic energy which was previously dissipated as mechanical overshoot and audible noise is now dissipated in the shorting elements and the winding of the motor. The invention is such that the shorting is removed during the drive pulse so that excessive power dissipation is avoided.

DESCRIPTION OF THE PREFERRED EMBODIMENTS

Figure 1:
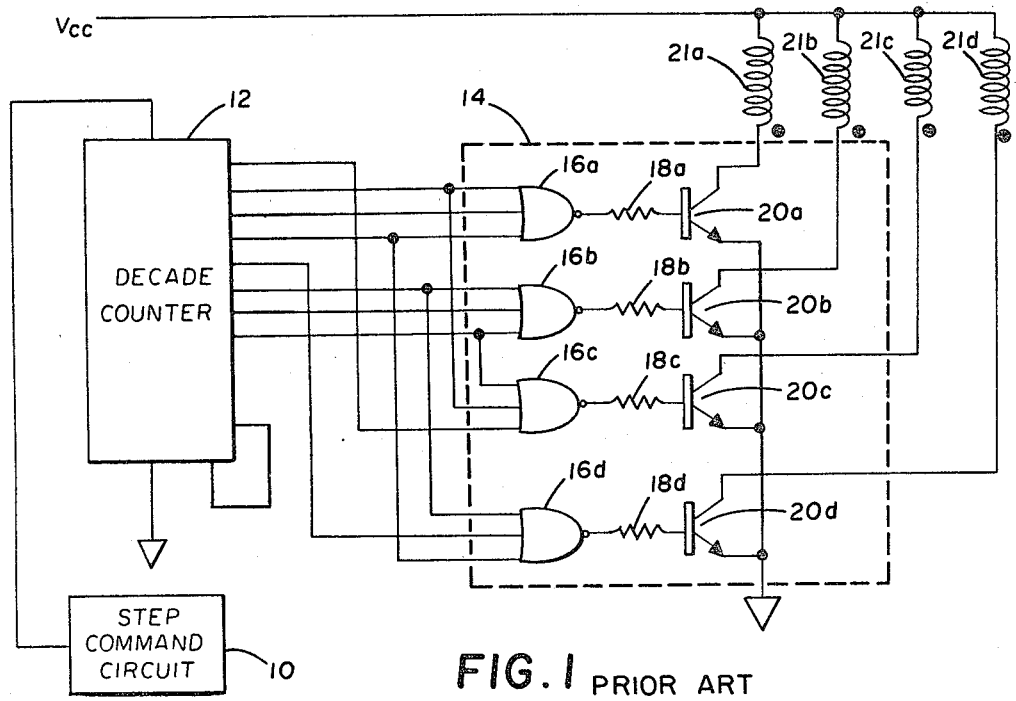
FIG. 1 is a prior art basic half-step drive circuit for stepper motors.

A description of the invention follows, referring to the drawings in which like reference numerals denote like elements of structure in each of the several Figures.

Referring now to FIG. 1, a step command circuit 10 provides digital pulses at a predetermined step frequency which ultimately determines the speed of the stepping motor. Step command circuit 10 is operatively connected to a decade counter 12. Decade counter 12 is of a type in which each digital step received from the step command circuit 10 will generate a digital pulse on an individual output line of the decade counter 12. For example, in a decade counter that has ten output lines, it will take ten digital pulses from the step command circuit 10 to complete the counting sequence. The first digital pulse from the step command 10 will activate the first output of the decade counter 12 only, the second digital pulse from the step command circuit 10 will activate the second output of the decade counter only, etc. The decade counter 12 is connected to a series of switching devices 14 which comprise NOR gates 16a through 16d, series resistors 18a through 18d and NPN transistors 20a through 20d. The collectors of the transistors are connected to the individual coil windings 21a through 21d within the stepping motor, the transistors acting as switches. The other end of the coils within the stepper motor are attached to the power supply. As will be appreciated by those skilled in the art, decade counter 12 is wired to NOR GATES 16a through 16d in such a pattern as to provide switching of transistors 20a to 20d in a pattern required to drive a typical stepper motor. When transistors 20a through 20d are turned "on", current is drawn through the drive coil within the stepper motor, thus powering the stepper motor. The problem with the prior art drive circuit shown in FIG. 1 is that the stepper motor drive coils will also act as a voltage generator due to the momentum of the rotor within the motor itself and intercoil coupling. In a typical stepper motor that is powered by a five-volt continuous power supply, it is possible that the stepper motor driver coil can generate voltages as high as 60 volts D.C. The present invention contemplates shorting all non-energized motor windings just following every drive pulse in order to have the motor act as the short circuit generator just after the moving member has reached its new desired position. The kinetic energy which was previously dissipated as mechanical overshoot and audible noise will be dissipated in the shorting elements and the windings of the motor.

Figure 2:
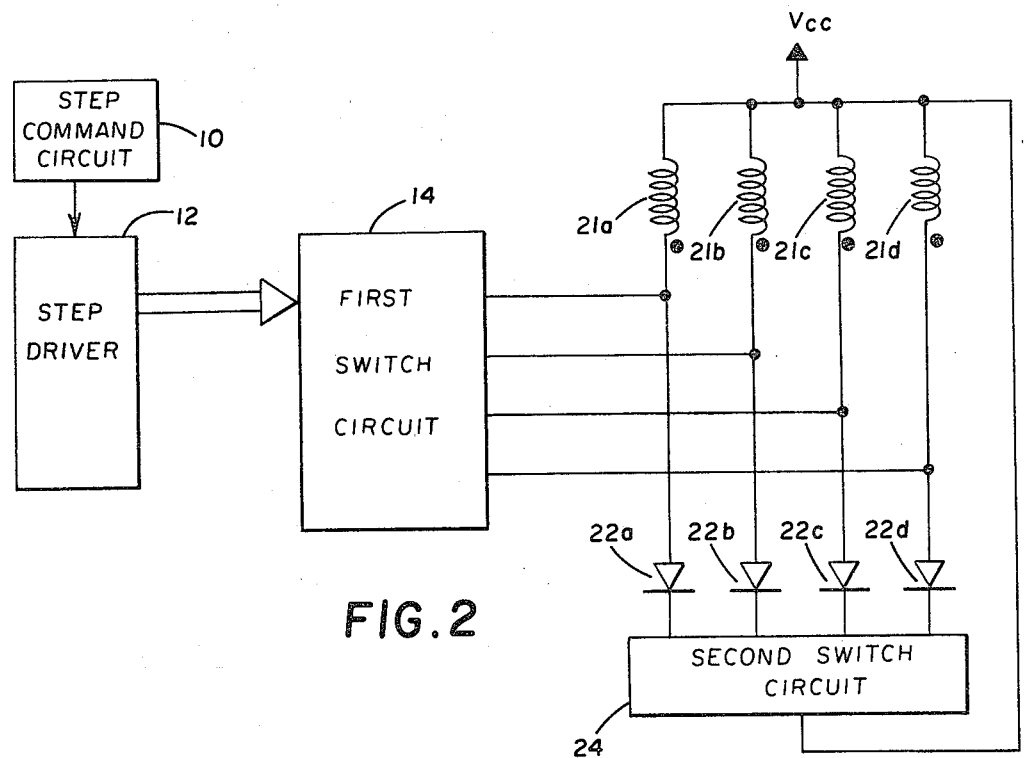
FIG. 2 is a block diagram showing the generalized embodiment of the present invention.

FIG. 2 shows the modification to the prior art circuit shown in FIG. 1 in which the step command circuit 10 is connected to a sequence driver 12 such as the decade counter shown in FIG. 1. The sequence driver 12 is connected to a first switching circuit 14 which was exemplified in FIG. 1 with the combination of NOR gates, series resistors, and transistors. The switching circuit 14 is then connected to the individual drive coils within the stepper motor. A series of diodes 22a through 22d are operatively connected at their anodes to the stepper motor drive coils 21a through 21d on the same side as the first switching circuit 14 is connected. On the cathode side of diodes 22a through 22d, a voltage sensitive switching circuit 24 is provided. The output of switching circuit 24 is connected to the power supply side of the drive coils within the stepper motor. The operation of the present invention can be appreciated by following a single switching step of a stepping motor. Assume that it is desirable to power coil 21a within the stepper motor.

First switching circuit 14 will switch the unpowered side of the drive coil 21a to essentially ground. Unpowered coils 21b through 21d are essentially in what is known in the art as a floating mode, i.e. the unpowered side of the coils has a voltage equal to the powered side of the coils. Because the stepper motor acts as a voltage generator due to intercoil coupling, the non-energized coils 21b through 21d will build up a voltage in excess of the power supply voltage. The kinetic energy will thus be dissipated as mechanical overshoot and audible noise. In the present invention the generated voltage in the non-energized coils will pass because of forward bias through the respective diodes 22b through 22d into the voltage sensitive switch 24. Once the generated voltage exceeds a predetermined level, the voltage sensitive switch 24 will then short the unpowered side of the non-energized coils to the powered side, thus dissipating the kinetic energy of the non-energized coils. The present invention contemplates energizing the voltage sensitive switch 24 when the non-powered side of the non-energized coils reaches approximately twice the voltage of the powered side. As mentioned previously the non-powered side of the non-energized coils in a five-volt stepper motor may reach voltages as high as 60 volts. The present invention contemplates clamping or shorting this voltage at approximately 12 volts.

Figure 3:
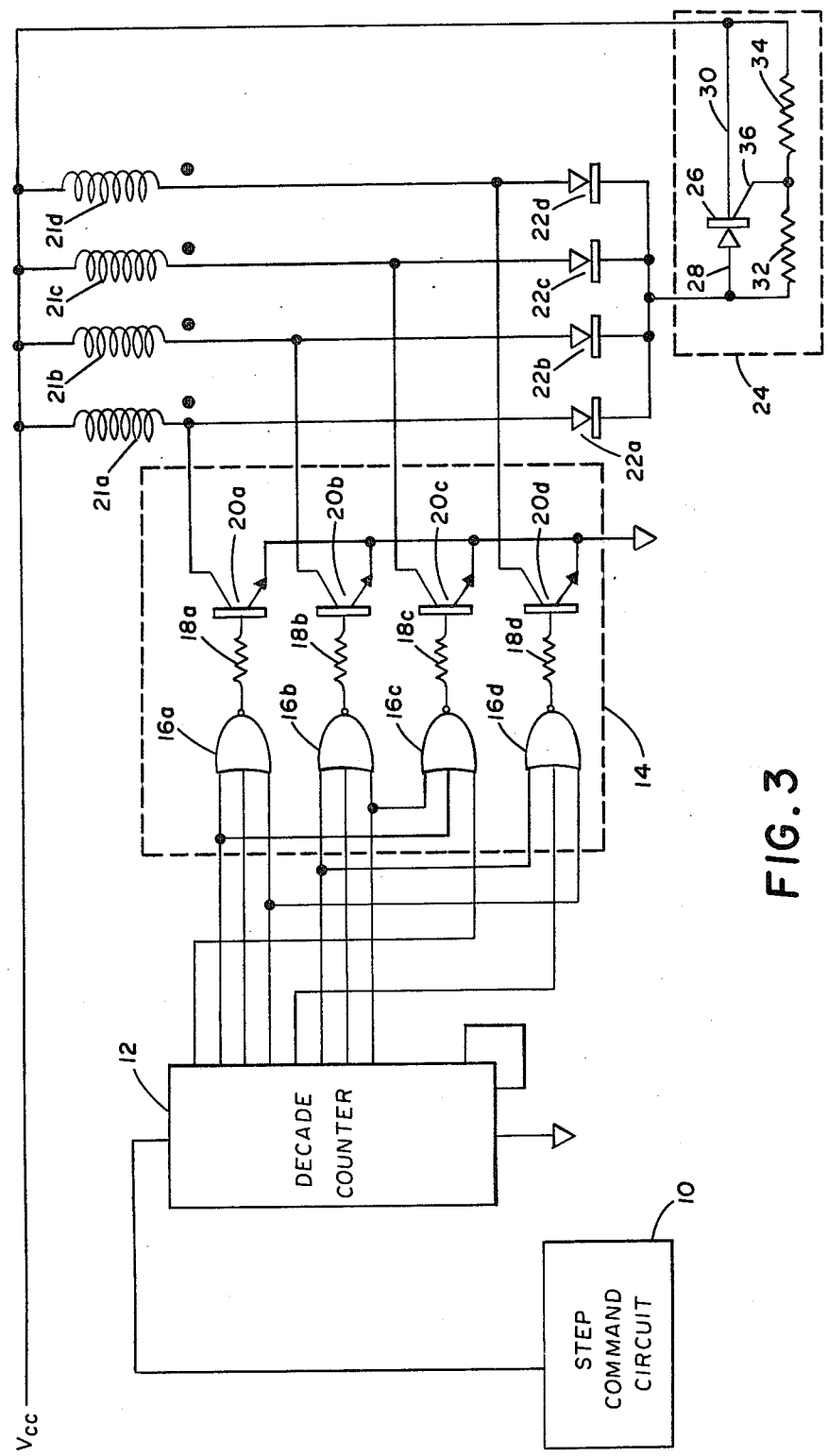
FIG. 3 is a circuit diagram showing the embodiment of the present invention according to the generalized embodiment shown in FIG. 2.

In a specific embodiment of the present invention, FIG. 3 shows the basic stepper motor drive circuit of FIG. 1 with the diodes 22a through 22d including voltage sensitive switch 24. Voltage sensitive switch 24 comprises an SCR 26 which has its anode 28 operatively connected to the cathode side of diodes 22a through 22d and the cathode side 30 connected to the powered side of the coils of the stepper motor. Two resistors 32 and 34 are provided in series across the anode 28 of SCR 26 and cathode 30 of SER 26 with the gate 36 of SCR 26 attached at the junction point of the two resistors 32 and 34. The resistive values of resistors 32 and 34 in conjunction with the type of SER 26 chosen will determine the voltage which as known in the art will fire the SCR 26. As mentioned above, the present invention contemplates the SCR firing at a voltage which is equal to approximately twice the power supply voltage of the stepper motor. In a five-volt stepper motor such as mo 61 D manufactured by Superior Electric it has been found that a resistive value of 22KOHMS for resistor 32 and a resistive value of 1 KOHMS for resistor 34 in conjunction with a 2N5061 SCR works quite satisfactory at clamping the generated voltage at 12 volts D.C. It will be appreciated by those skilled in the art that the voltage sensitive switch network 24 can be repeated for each individual coil of a stepper motor, thus eliminating the need for diodes 22a through 22d. It is believed, however, that using one voltage sensitive switch in conjunction with diodes 22a through 22d acting as isolators would be the less expensive and best mode of the invention.

Figure 4:
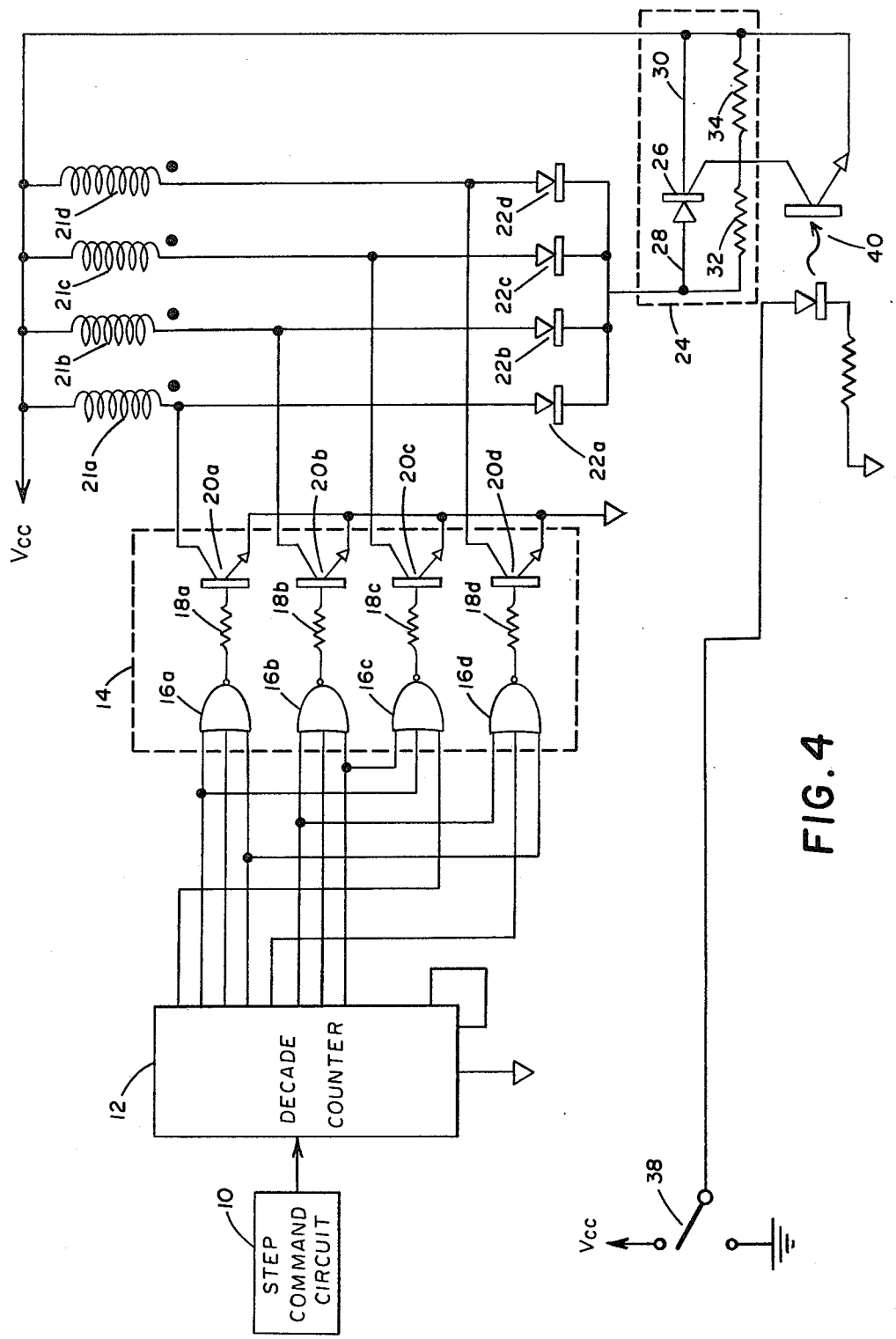
FIG. 4 is a circuit diagram showing another embodiment of the present invention that is used for high speed operation of a stepper motor.

Turning now to FIG. 4, it may be desirable to inactivate the voltage sensitive switch during high speed, continuous operation of the stepper motor since one would not be concerned with stopping the motor at any given location. A switch 38 is provided which would be set in one position when the motor is to operate at high speed and a second position when the motor is to operate at low speed and permitting auto-dampening to occur. A photo coupler 40 is provided with the collector tied to the gate of SCR 26 and the emitter connected to the power supply of the coils within the stepper motor. When switch 38 is set in the high speed position, SCR 26 is essentially disabled, thus preventing the voltage sensitive switch network 24 from clamping the non-powered side of the individual coils within the stepper motor. When switch 38 is set in the low speed position, the voltage sensitive switch 24 is enabled, thus allowing automatic clamping or shorting of the non-powered side of the non-energized coils within the stepper motor.

I claim:

1. A method for damping the rotational motion of a stepper motor of the type having individual motor windings having intercoil coupling, one side of which is continuously energized and the other side of which is non-energized but is connected to a switching device, said switching device causing current to flow through said coils when said switching device is in one state and causing no current to flow through said coils when said switching device is in a different state, said method comprising the steps of:
   a. sensing the voltages of the non-energized side of each of said coils;
   b. sensing the voltage of the energized side of said coils;
   c. comparing the sensed voltages of each of the non-energized side of said coils to the energized side of said coils; and
   d. shunting the non-energized side of each of said coils to said energized side of said coils when the voltage of the non-energized side exceeds some predetermined value greater than the voltage of the energized side.

2. A method for damping the rotational motion of a stepper motor of the type having individual motor windings having intercoil coupling, one side of which is continuously energized and the other side of which is non-energized but is connected to a switching device, said switching device causing current to flow through said coils when said switching device is in one state and causing no current to flow through said coils when said switching device is in a different state, said method comprising the steps of:
 a. isolating the non-energized side of each of said coils electrically;
 b. sensing all the voltages of the isolated non-energized side of said coils;
 c. sensing the voltage of the energized side of said coils;
 d. comparing the voltages of all of said non-energized sides of said coils to said energized side of said coil; and
 e. shunting the voltage on all the non-energized side of said coils to the energized side if any of said coils when any of the voltages of the non-energized side exceeds some predetermined value greater than the voltage of the energized side.

3. The method of claim 1 or 2 wherein the shunting occurs when the voltage on the non-energized side is equal to two times the voltage of the energized side.

4. An electrical damping apparatus for use with stepper motors of the type having individual motor windings having intercoil coupling, one side of the coils being continuously energized and the other side being non-energized but being connected to a switching device, said switching device causing current to flow through said coils when said switching device is in one state and causing no current to flow through said coils when said switching device is in a different state, said damping apparatus comprising:
 means for individually sensing the voltages of the non-energized side coils;
 means for sensing the voltage of the energized side of said coils; and
 means for individually shunting the voltage for each of the non-energized side of said coils to the energized side of said coil whenever the voltage of the non-energized side of an individual coil exceeds a predetermined value greater than the voltage of the energized side of said coil.

5. The apparatus of claim 4 wherein the means for individually sensing the voltages of the non-energized side coils, the means for sensing the voltage of the energized side of said coils, and the means for individually shunting the voltage for each of the non-energized side of said coils to the energized side of said coil whenever the voltage of the non-energized side of an individual coil exceeds a predetermined value greater than the voltage of the energized side of said coil is an SCR.

6. An electrical damping apparatus for use with stepper motors of the type having individual motor windings having intercoil coupling, one side of the coils being continuously energized and the other side being non-energized but being connected to a switching device, said switching device causing current to flow through said coils when said switching device is in one state and causing no current to flow through said coils when said switching device is in a different state, said damping apparatus comprising:
 means for electrically isolating each of the non-energized sides of said coils;
 means for collectively sensing the voltages of the non-energized sides of said coils through said isolation means;
 means for shunting all voltages present at the non-energized sides of said coils through said isolation means when the voltage at the non-energized side of any of said coils exceeds some predetermined value greater than the voltage of the energized side.

7. The apparatus of claim 6 wherein the means for sensing and the means for shunting is an SCR.

8. The apparatus of claim 6 or 7 wherein the shunting occurs when the voltage on the non-energized side is equal to two times the voltage of the energized side.

* * * * *